US008172255B1

(12) United States Patent  (10) Patent No.: US 8,172,255 B1
Martin  (45) Date of Patent: May 8, 2012

(54) HEIGHT-ADJUSTABLE KITCHEN CART

(76) Inventor: Rebecca Martin, Tuscumbia, MO (US)

( * ) Notice: Subject to any disclaimer, the term of this patent is extended or adjusted under 35 U.S.C. 154(b) by 638 days.

(21) Appl. No.: 12/291,216

(22) Filed: Nov. 7, 2008

(51) Int. Cl.
*B62B 3/02* (2006.01)
(52) U.S. Cl. ............ 280/651; 280/43.23; 187/244; 254/8 C
(58) Field of Classification Search ........... 280/638, 280/639, 651, 656, 659, 43, 43.17, 43.18, 280/43.23; 187/244, 269, 233, 234, 243, 187/272; 254/122, 124, 9 C, 8 C, 2 C
See application file for complete search history.

(56) References Cited

U.S. PATENT DOCUMENTS

| | | | |
|---|---|---|---|
| 2,628,068 A | 2/1953 | Sehnert | |
| 2,645,538 A * | 7/1953 | Segal | 108/145 |
| 2,829,863 A * | 4/1958 | Gibson | 254/8 C |
| 4,557,201 A * | 12/1985 | Webb, Jr. | 109/45 |
| 4,796,909 A | 1/1989 | Kirkendall | |
| 5,114,118 A | 5/1992 | Schrader | |
| 5,193,649 A * | 3/1993 | Lee | 187/244 |
| 5,678,976 A | 10/1997 | Rodriguez | |
| 5,823,737 A | 10/1998 | Cook | |
| D404,871 S | 1/1999 | Golichowski et al. | |
| D410,577 S | 6/1999 | Ciphers, Sr. | |
| D415,600 S | 10/1999 | Hsieh et al. | |
| 6,286,812 B1 * | 9/2001 | Cherry | 254/9 C |
| 6,622,592 B2 * | 9/2003 | Lee | 74/563 |
| 6,857,493 B2 * | 2/2005 | Shupp et al. | 180/168 |
| 7,194,857 B2 * | 3/2007 | Hung | 60/478 |
| D551,416 S | 9/2007 | Hanaoka | |
| 7,484,252 B2 * | 2/2009 | Wang | 5/81.1 C |
| 2006/0197296 A1 * | 9/2006 | Rice et al. | 280/33.994 |

* cited by examiner

*Primary Examiner* — John Walters

(74) *Attorney, Agent, or Firm* — Montgomery Patent & Design, LLC; Robert C. Montgomery; Joseph T. Yaksich

(57) ABSTRACT

A height-adjustable cart intended for use in kitchens when transferring food among ovens, stoves and countertops is herein disclosed. The cart comprises a pair of foot-release pedals located at the base of the cart, which, when depressed, vertically adjusts the top tray surface upwardly or downwardly as desired. Thus, the user is able to equalize the height between the cart and other cooking surfaces such as ovens, stoves, countertops and even serving tables. This feature allows the user to simply slide food on and off of the cart without having to pick it up or carry it. This is ideal when dealing with heavy trays of food or food that is extremely hot.

7 Claims, 7 Drawing Sheets

HEIGHT-ADJUSTABLE KITCHEN CART

RELATED APPLICATIONS

The present invention was first described in a notarized Official Record of Invention on Aug. 23, 2007, that is on file at the offices of Montgomery Patent and Design, LLC, the entire disclosures of which are incorporated herein by reference.

FIELD OF THE INVENTION

The present invention relates generally to a kitchen cart and, more particularly, to said cart comprising a height-adjustable cart, a tray, four (4) wheels, two (2) scissor lift assemblies, two (2) hydraulic actuators, and a hydraulic pump, said cart provides a means to raise and lower food stuffs and/or other items as well as transport the same from place to place.

BACKGROUND OF THE INVENTION

When cooking in the kitchen is a very common task to have to move trays of food from one (1) area or surface to another. These locations include ovens, stoves, countertops, serving tables, and even dining tables. While small containers of food are typically easily moved about, larger containers such as large casseroles, fragile containers such as large cakes or quiches, or even hot food pose more of a problem. It is often necessary to enlist the help of another person or intermediate transfer aids when dealing with such foods. However, even with such help, transfer still remains a risky proposition. These same problems exist in other fields of work where items must be transferred from one work surface to another at differing elevations. Accordingly, there exists a need for means by which large or fragile items can be easily transferred from work surfaces of varying heights. The development of the apparatus herein fulfills this need.

The present invention is an adjustable height cart system intended for use in kitchens when transferring food between ovens, stoves, and countertops. The height-adjustable kitchen cart may appear to be a small television tray-like apparatus with folding scissor lifts, wheeled casters, and a foot release pedal located at the base of the invention. When the foot pedal is pressed, the top tray surface adjusts up or down as controlled by the user. In such a manner as the user is able to equalize the height between tray surface and other cooking surfaces such as ovens, stoves, countertops, and even serving tables This feature allows the user to simply slide food stuffs on to and off of the invention without having to pick it up or carry it. This is ideal when dealing with heavy trays of food or food that is extremely hot. It is envisioned that the invention could be used in other areas such as in the medical field, laboratory work, school work, and virtually any environment were items must be transferred from one surface to another. The use of the present apparatus provides for a height customizable work surface in such a manner which is not only quick, easy and effective, but safer for a user.

Several attempts have been made in the past to provide for portable lifting apparatuses. U.S. Pat. No. 2,628,068, issued in the name of Sehnert, discloses an elevating truck comprising a large solid lifting platform and a lifting mechanism further comprising a plurality of pivoting lifting links which raise the platform. However, unlike the present apparatus, the Sehnert elevating truck provides a much larger lifting platform for power tools and other large equipment and lacks the ability to be positioned adjacent to an enclosure with an open door such as an oven.

U.S. Pat. No. 4,796,909, issued in the name of Kirkendall, discloses a low-bed service cart comprising a size adjustable wheeled cart and a pull handle which provides a means of transporting heavy loads over rough terrain. However, unlike the present apparatus, the Kirkendall low-bed service cart does not provide any type of lifting means.

U.S. Pat. No. 5,114,118, issued in the name of Schrader, discloses a vertical lift dolly comprising a dolly frame, a load table, and a load handle which provides a means to vertically lift and lower and transport a load. However, unlike the present apparatus, the Schrader vertical lift dolly is similar to a conventional hand truck with particular additions such as an extended load table which can be raised and lowered mechanically which is ill-suited for kitchen uses.

U.S. Pat. No. 5,678,976, issued in the name of Rodriguez, discloses a hand truck for moving large drums comprising two (2) rigid arms, a tiltable frame, and two (2) wheels which provides a means for easily transporting large industrial drums. However, unlike the present apparatus, the Rodriguez hand truck for moving large drums lacks any type of lifting mechanism.

Additionally, various ornamental designs for adjustable carts and lifting apparatuses have been provided, particularly, U.S. Pat. Nos. D 410,577, D 415,600, and D 551,416. However, none of these designs are similar to the present apparatus.

The prior art appears to disclose various apparatuses which attempt to provide an portable cart which provide a means for conveniently raising and lowering objects. However, none of the prior art particularly describes a height-adjustable kitchen cart comprising a tray, a hydraulic lifting system, a scissor lift assembly and a foot pedal control assembly. Accordingly, there exists a need for a means by which a variety of food stuffs and other objects can be easily and conveniently transported and positioned to a desired height that operates without the disadvantages as described above.

SUMMARY OF THE INVENTION

In view of the foregoing disadvantages inherent in the prior art, it has been observed that there is need for a height-adjustable kitchen cart comprising a tray surface, a hydraulic lifting system, a scissor lift assembly and a foot pedal control assembly which provides a means for conveniently transporting and raising and lowering objects in a manner which is quick, easy and effective.

To achieve the above objectives, it is an object of the present invention to provide a height-adjustable cart apparatus comprising a first scissor lift assembly, a second scissor lift assembly, a tray, a base, a hydraulic pump, a first foot pedal, a second foot pedal, a first hydraulic line, and a second hydraulic line.

A further object of the present invention is having the first scissor lift assembly located along a first outside edge region of the apparatus comprise a first hydraulic actuator mechanically connected thereto a first hydraulic cylinder.

Another object of the present invention is having the second scissor lift assembly located along a second outside edge region of the apparatus opposite the first outside edge region comprise a second hydraulic actuator mechanically connected thereto a second hydraulic cylinder.

A further object of the present invention is having the tray comprise an upper surface movably attached thereto the first scissor lift assembly and the second scissor lift assembly.

Another object of the present invention is having the base providing support thereto the apparatus comprise at least one (1) wheel affixed thereto an underside surface of the base thereby allowing easier mobility of the apparatus.

A further object of the present invention is having the hydraulic pump for producing hydraulic pressure comprise a vent cap located along an upper surface thereby allowing a user to fill the hydraulic pump with hydraulic fluid and providing a ventilation means thereto the hydraulic pump.

Another object of the present invention is having the first foot pedal and the second foot pedal mechanically attached thereto the hydraulic pump.

A further object of the present invention is having the first hydraulic line affixed thereto the base connecting the hydraulic pump thereto the first hydraulic cylinder and providing the hydraulic pressure thereto the first hydraulic cylinder.

Another object of the present invention is having the second hydraulic line affixed thereto the base connecting the hydraulic pump thereto the second hydraulic cylinder and providing the hydraulic pressure thereto the second hydraulic cylinder.

Yet another object of the present invention is having the upper surface of the tray accommodate a plurality of various items thereupon.

Still yet another object of the present invention is having the tray lowered or raised by the first scissor lift assembly and the second scissor lift assembly by the user exerting an action thereupon the first foot pedal or the second foot pedal.

Still yet another object of the present invention is having activation of the first foot pedal activate the hydraulic pump thereby raising the tray.

Still yet another object of the present invention is having activation of the second foot pedal release the hydraulic pressure thereby lowering the tray.

Yet another object of the present invention is having the apparatus allow the user to more easily transport the plurality of various items.

Still yet another object of the present invention is having the tray further comprise a lip along three (3) sides of the tray leaving a front end exposed wherein the lip serves as a barrier to prevent the plurality of various items from falling off the upper surface of the tray.

Yet still another object of the present invention is having the first scissor lift assembly further comprise the first hydraulic actuator pivotally attached thereto the base via a first pivot pin, a first support member pivotally connected thereto a third support member, the first support member slidably connected thereto the base via a first set of rollers that motion across a first set of lower tracks affixed thereto the base, the third support member pivotally attached thereto an underside surface of the tray, a first scissor first central member movably attached thereto the first support member by a fixed pivotal hinge connection, thereby allowing the first support member and the first scissor first central member to rotate upon actuation via the first hydraulic actuator, and a first scissor second central member pivotally connected thereto the first scissor first central member.

Still another object of the present invention is having extension of the first hydraulic cylinder move the first scissor lift assembly upwardly in an extended orientation and retraction of the first hydraulic cylinder move the first scissor lift assembly downwardly in a retracted orientation.

Still yet another object of the present invention is having the second scissor lift assembly further comprise the second hydraulic actuator pivotally attached thereto the base via a second pivot pin, a second support member pivotally connected thereto a fourth support member, the second support member slidably connected thereto the base via a second set of rollers that motion across a second set of lower tracks affixed thereto the base, the fourth support member pivotally attached thereto an underside surface of the tray, a second scissor first central member movably attached to the second support member by a fixed pivotal hinge connection, thereby allowing the second support member and the second scissor first central member to rotate upon actuation via the second hydraulic actuator, and a second scissor second central member pivotally connected thereto the second scissor first central member.

Yet another object of the present invention is having extension of the second hydraulic cylinder move the second scissor lift assembly upwards in an extended orientation and retraction of the second hydraulic cylinder move the second scissor lift assembly downwardly in a retracted orientation.

Still another object of the present invention is having the first scissor lift assembly and the second scissor lift assembly powered by a pneumatic means to provide a force to raise and lower the tray.

Yet another object of the present invention is having the first scissor lift assembly and the second scissor lift assembly powered by an electrical means to provide a force to raise and lower the tray.

Still yet another object of the present invention is having the first foot pedal and the second foot pedal further comprise a controlling mechanism which would control a speed at which the tray is lowered or raised.

Yet still another object of the present invention is having the first foot pedal and the second foot pedal further comprise a rubber tread attached thereto to provide greater traction.

Still another object of the present invention is having the apparatus further comprise four (4) wheels symmetrically spaced thereto the underside surface of the base.

Yet another object of the present invention is having the at least one (1) wheel further comprise a locking lever thereby preventing unwanted movement of the apparatus.

Another object of the present invention is providing a method for using a height-adjustable cart apparatus.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
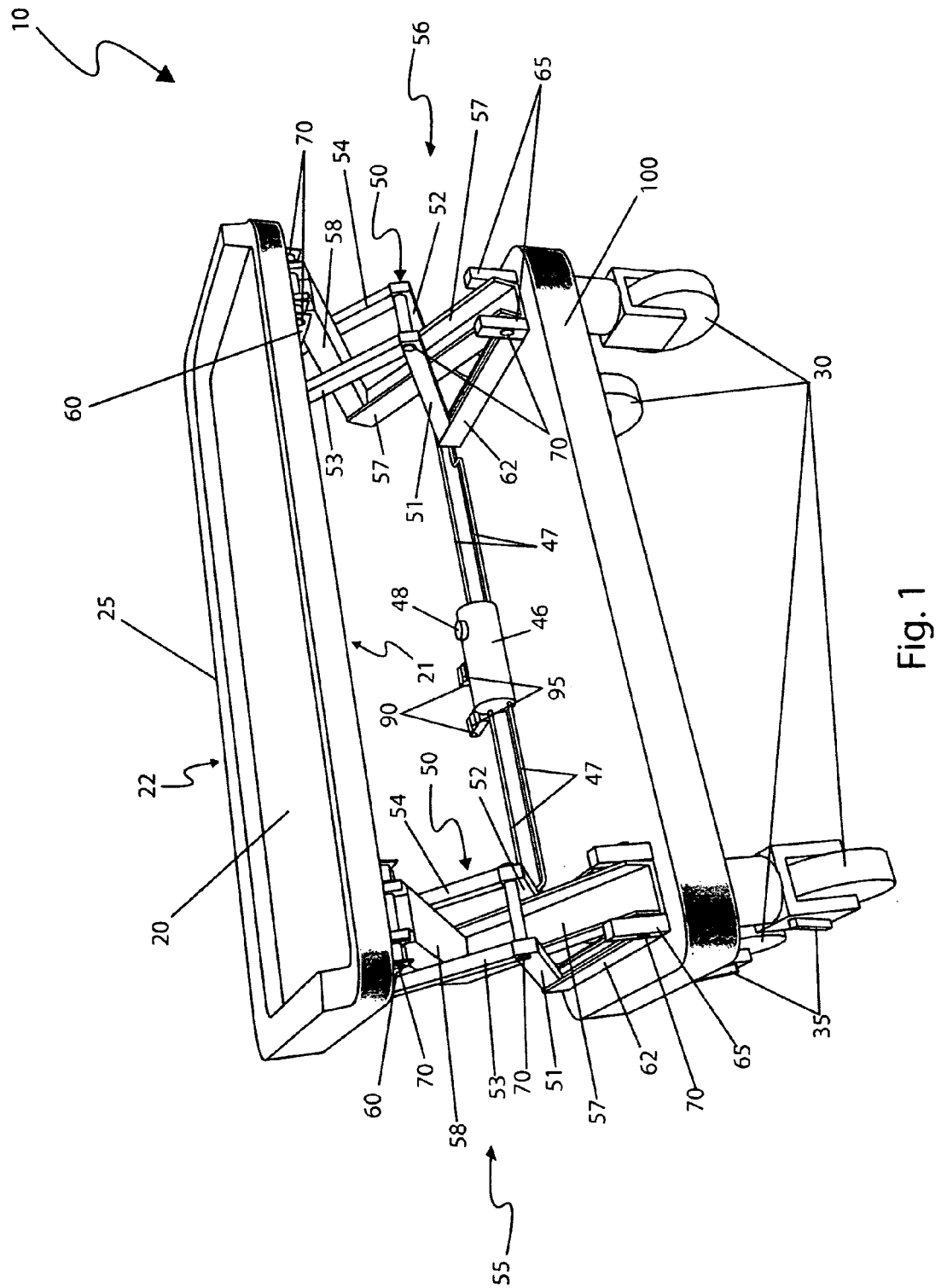
FIG. 1 is a perspective view of a height-adjustable kitchen cart 10 in a retracted orientation, according to a preferred embodiment of the present invention.

| | |
|---|---|
| 10 | height-adjustable kitchen cart |
| 20 | tray |
| 21 | front end |
| 22 | rear end |
| 25 | lip |
| 30 | caster wheel |
| 35 | locking lever |
| 40 | hydraulic actuator |
| 45 | hydraulic cylinder |
| 46 | hydraulic pump |
| 47 | hydraulic line |
| 48 | vent/fill cap |
| 50 | scissor lift assembly |
| 51 | first support member |
| 52 | second support member |
| 53 | third support member |
| 54 | fourth support member |
| 55 | first scissor lift assembly |
| 56 | second scissor lift assembly |
| 57 | first central member |
| 58 | second central member |
| 60 | set of upper tracks |
| 62 | set of lower tracks |
| 63 | roller |
| 65 | bracket |
| 70 | pivot |
| 80 | slot |
| 85 | pivot mechanism |
| 90 | foot pedal |
| 95 | rubber tread |
| 100 | base |

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method to adjustably raise and/or lower food, products, and/or other items as desired on a motionable cart that may also be transported from place to place. The height-adjustable kitchen cart (herein described as the "apparatus") 10 comprises a tray 20, four (4) caster wheels 30, a pair of scissor lift assemblies 50, a pair of hydraulic actuators 40, and a hydraulic pump 46. The apparatus 10 is envisioned to be fabricated from strong metallic and/or synthetic materials formed in a stamping, machining, and finishing processes.

Figure 2:
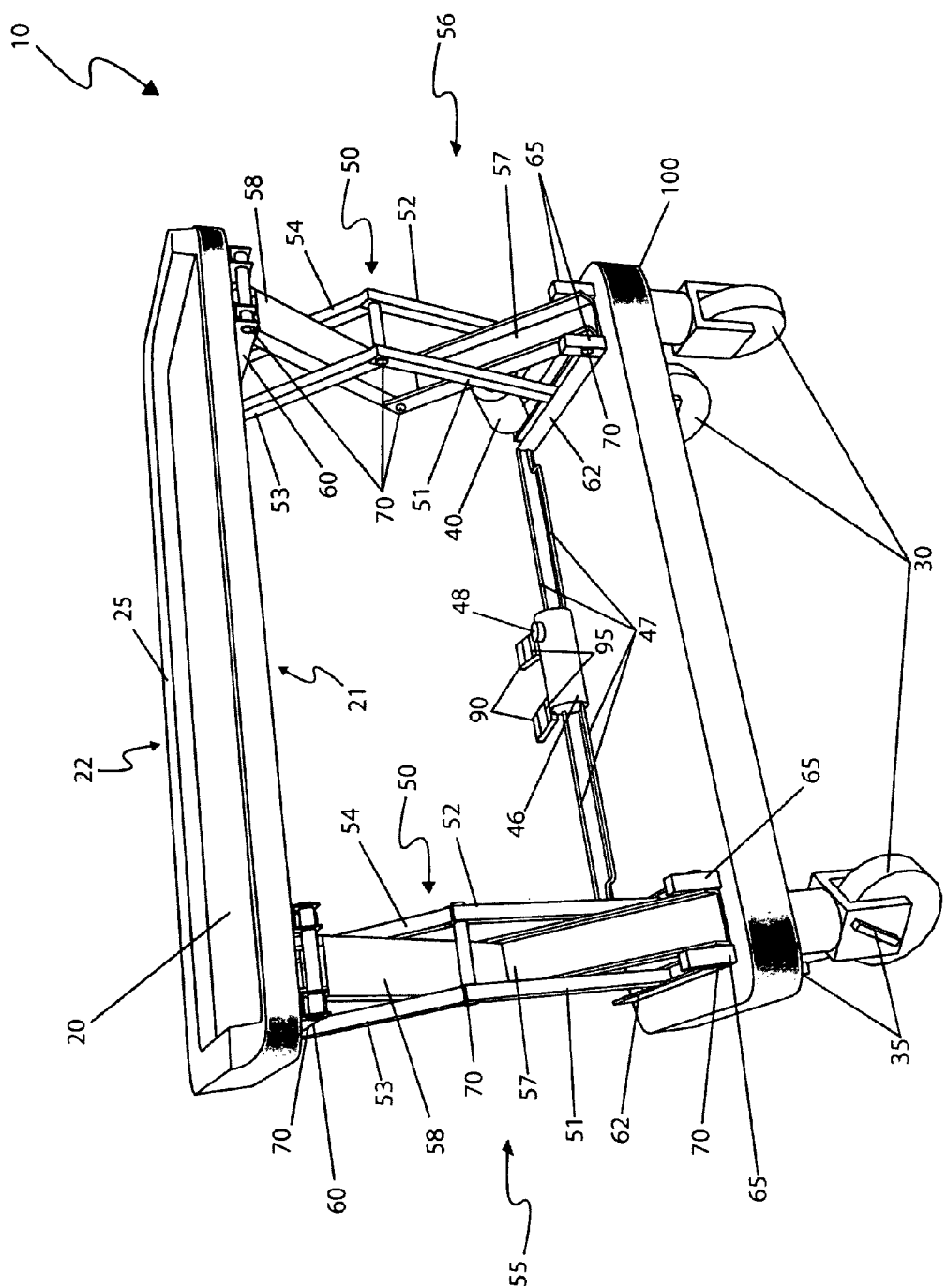
FIG. 2 is a perspective view of the height-adjustable kitchen cart 10 in an extended orientation, according to a preferred embodiment of the present invention.

Referring now to FIGS. 1 and 2, perspective views of the apparatus 10, are now disclosed according to the preferred embodiment of the present invention. The apparatus 10 is envisioned to comprise a tray 20 movably attached thereto a pair of scissor lift assemblies 50 positioned along outer side edges so as to provide clearance of an open oven door during use. The tray 20 has an overall upper surface area sizable to accommodate foods, items, provisions, and/or a plurality of various items thereupon. The tray 20 is envisioned to be rectangularly-shaped comprising a rectangular cross-section with a reasonably dense thickness for optimum stability and strength capabilities. The upper surface of the tray 20 takes the form of a flat rectangular platform with a lip 25 integral thereto spanning along the partial periphery of said tray 20. Along the partial periphery of the tray 20 is a lip 25 that erects on three (3) sides leaving a front end 21 exposed. The tray 20 is envisioned to concave upwardly thereby forming a lip 25 to serve as a barrier along the sides and a rear end 22 to prevent items, provisions, food, or the like from falling over the edge. The lip 25 extends upward relatively perpendicular than from the planar surface of the tray 20 to not only serve as a barrier, but also to enable a user to manually grasp said lip 25 and maneuver the apparatus 10 from place to place.

Figure 3:
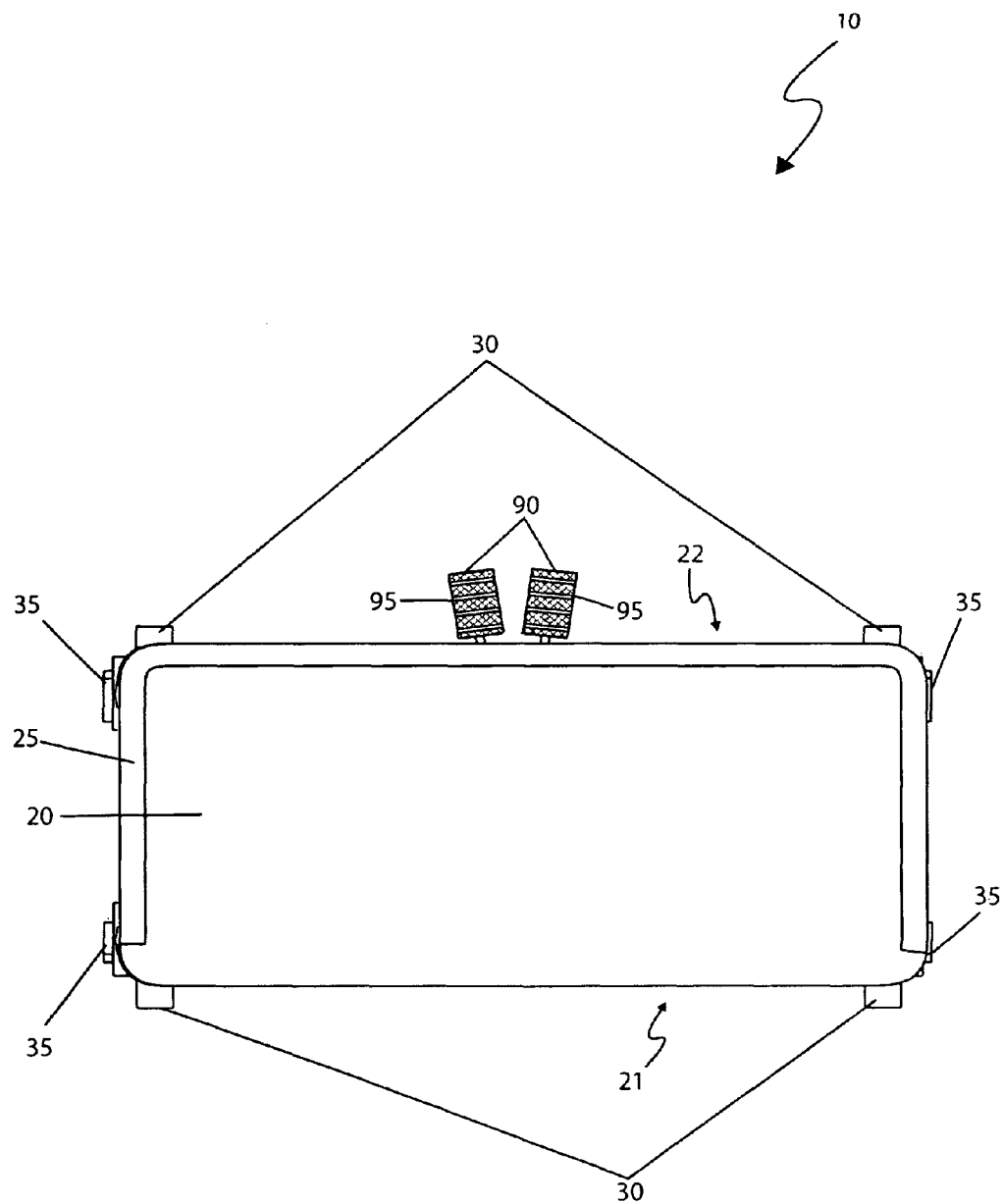
FIG. 3 is a top view of the height-adjustable kitchen cart 10, according to a preferred embodiment of the present invention.

Referring now to FIG. 3, a top view of the apparatus 10 is disclosed according to the preferred embodiment of the present invention. The tray 20 provides a surface upon which provisions, food, items, or the like to be lifted and transported from place to place. The tray 20 may be lowered via a pair of scissor lift assemblies 50, in which will be described subsequently, to place items on from a low position, as depicted in FIG. 1, for moving food from the oven to the tray 20 or visa versa, for example. Then, the tray 20 may be raised via said scissor lift assemblies 50, so that it is not necessary for the user to manually provide a constant lifting force, to transport from place to place, for example moving the food out of the oven to a kitchen countertop. The tray 20 is envisioned to be maintained substantially horizontal in a parallel arrangement therewith the ground surface despite the upward and downward movement via a scissor lift assembly 50 that occurs during the loading and/or unloading process of the food, provisions, items, or the like thereon said tray 20 surface.

Figure 4:
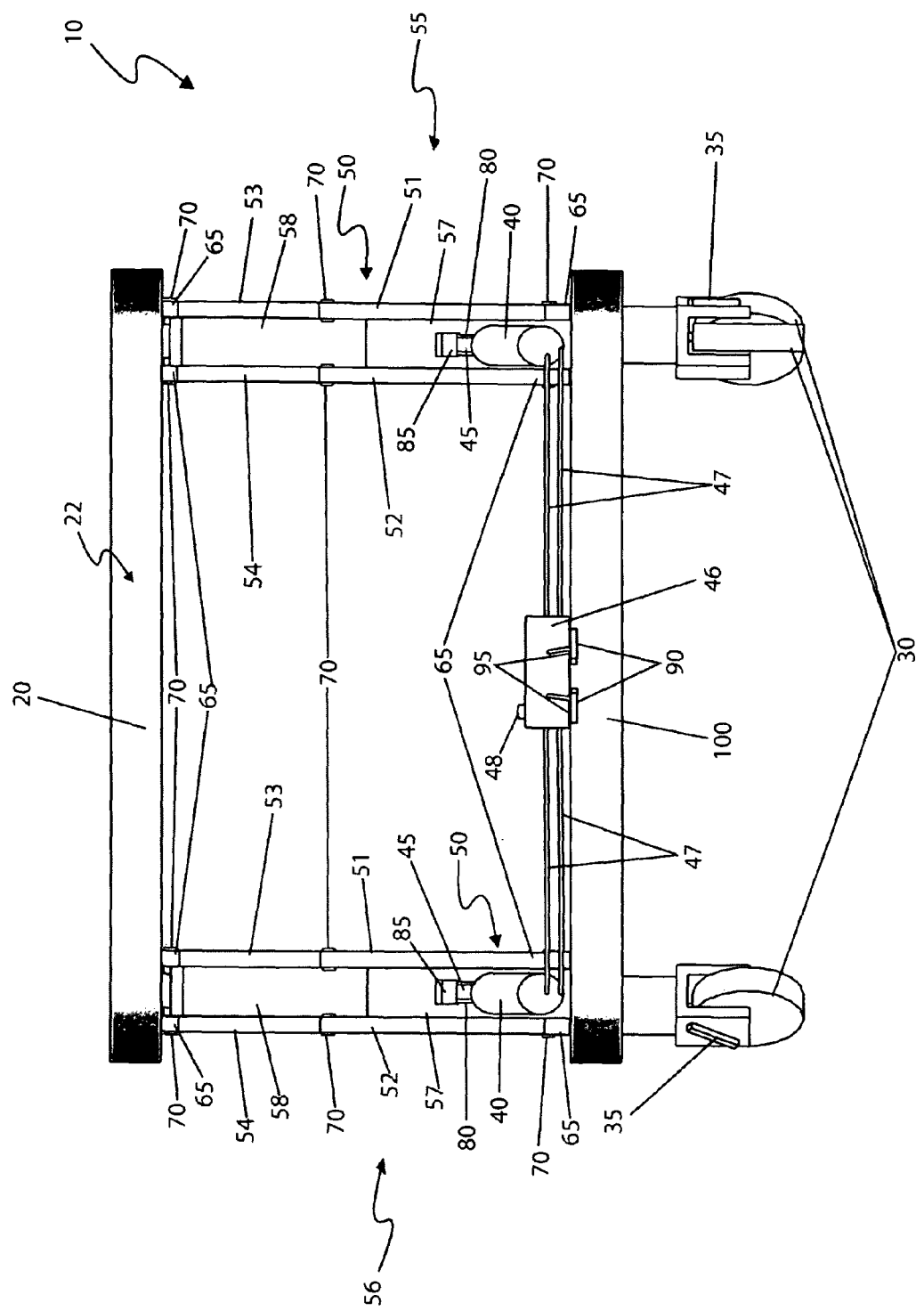
FIG. 4 is a rear view of the height-adjustable kitchen cart 10 in an extended orientation, according to a preferred embodiment of the present invention.
Figure 5:
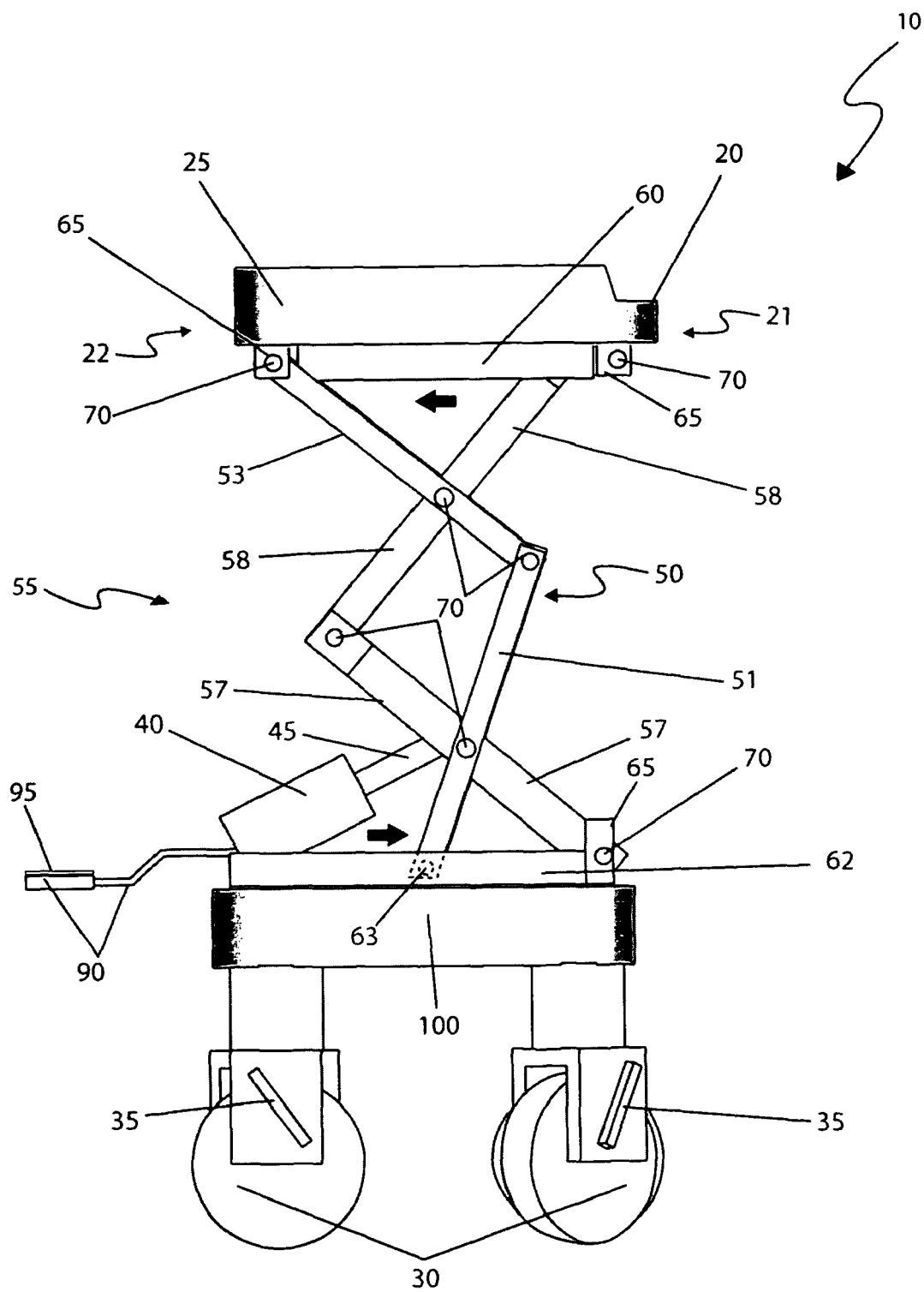
FIG. 5 is a left side view of the height-adjustable kitchen cart 10 in an extended orientation, according to a preferred embodiment of the present invention.
Figure 6:
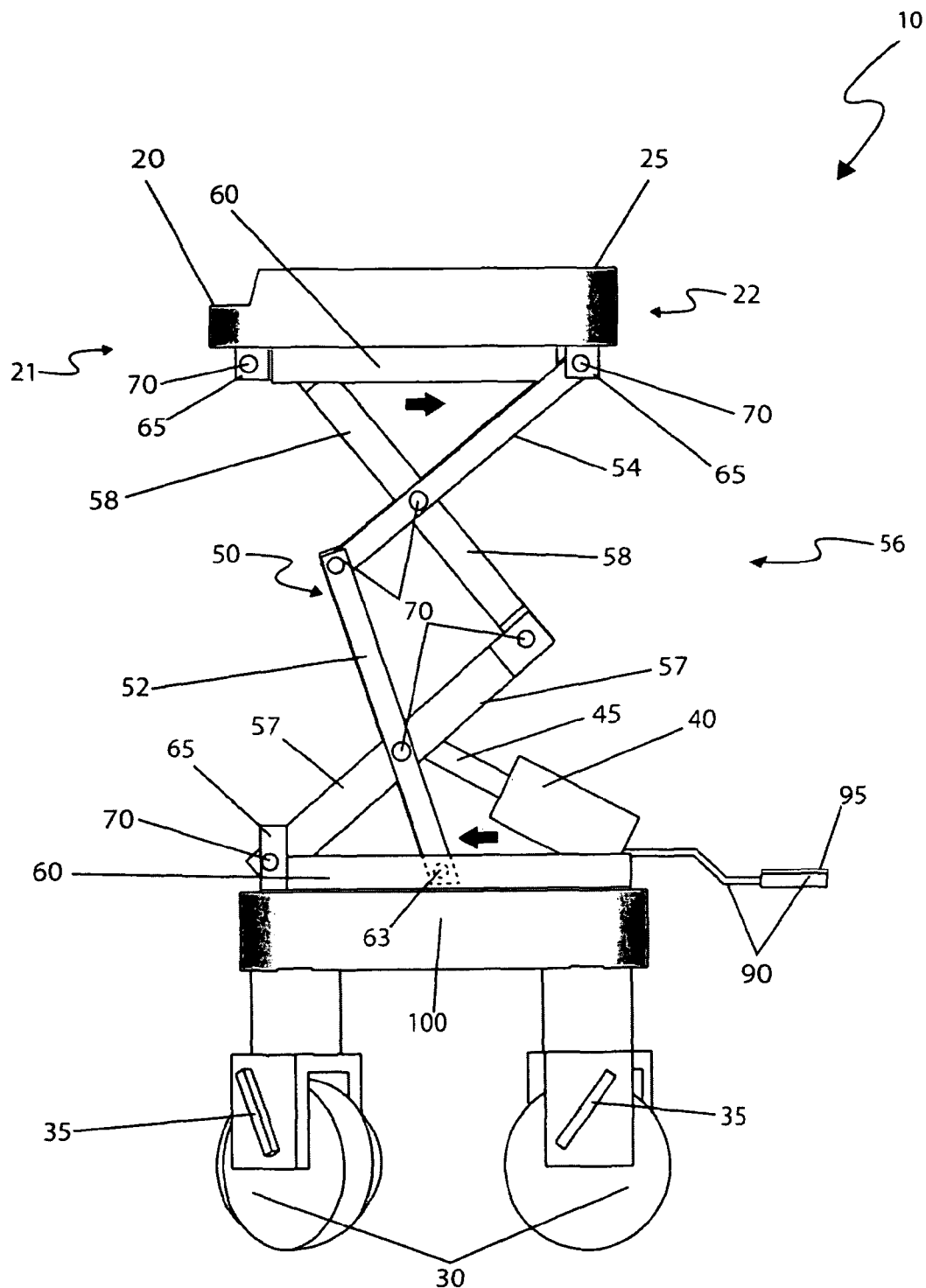
FIG. 6 is a right side view of the height-adjustable kitchen cart 10 in an extended orientation, according to a preferred embodiment of the present invention; and, FIG. 7 is a bottom side view of the height-adjustable kitchen cart 10, according to a preferred embodiment of the present invention.

Referring now to FIGS. 4 through 6, rear and side views of the apparatus 10 are disclosed according to the preferred embodiment of the present invention. A pair of scissor lift assemblies 50 along opposing outside edge regions are envisioned to comprise a plurality of rectangularly cross-sectional tubing, that spans at a designated length dependent on the size of the apparatus 10, dependent on the desired height at which the tray 20 would be raised and/or lowered, and/or dependent on other user preferences to transform the apparatus 10 into an elevated platform that provides optimum stabilization. A single scissor lift assembly 50 is described here for simplicity sake and is envisioned to comprise two (2) series of support members 51, 52, 53, 54 and central members 57, 58 thereof. The first series comprises a first 51 and second 52 support member and a cross-support central member 57, and the second series comprises a third 53 and fourth 54 support member and a second cross-support central member 58. The connection between the first 51 and second 52 support member and the central member 57 is a fixed pivotal hinge connection 70 thereby allowing said support members 51, 52 and central member 57 to rotate upon receipt of actuation via a hydraulic actuator 40. Positioned at the distal end of the first cross-support central member 57 is a fixed pivotal hinge connection 70 such to allow said central member 57 to rotate at a fixed point.

A slot 80 is configured along the partial length of the first cross-support central member 57 so as to engage a pivot mechanism 85 that is rotatably integral thereto the upper end of hydraulic cylinder 45 so as to allow said upper end of the hydraulic cylinder 45 to rotate along the length of said slot 80. The extension of the hydraulic cylinder 45 results in the upper end of said hydraulic cylinder 45 to rotate therewith the pivot mechanism portion 85 of the slot 80 as well as motion the scissor lift assembly 50 upwardly in the extended orientation. Additionally, when the hydraulic cylinder 45 retracts upon receipt of the opposing step pedal 90, the upper end of said hydraulic cylinder 45 rotates downwardly in the slot 80, thereby pulling the scissor lift assembly 50 downwardly in the retracted orientation, as depicted in FIG. 1. The two (2) foot pedals 90 provide a mechanical attachment thereto a common hydraulic pump 46 being similar to those found on automotive floor jacks comprising expected internal components including an internal reservoir, a pumping cylinder, and valving producing a hydraulic pressure and flow therefrom. The hydraulic pump 46 further comprises an expected vent/fill cap 48 located along an upper surface allowing a user to replenish a supply of hydraulic fluid while providing a ventilation means thereto the hydraulic pump 46 during use. Said hydraulic pressure is communicated thereto the hydraulic cylinders 45 via a pair of high pressure metal hydraulic lines 47 routed and affixed thereto the base portion 100 using standard tubing securing hardware, thereby providing raising and lowering motions thereto the tray 20 during use. Integrally attached thereto each scissor lift assembly 50 is a hydraulic actuator 40 utilized to apply a counteractive force thereagainst the weight of the tray 20 and the provisions settled thereupon. Each hydraulic actuator 40 is envisioned to be integrally attached thereto a base support 100 via a pair of brackets 65 and a pair of pivotal hinges 70. Each hydraulic actuator 40 is envisioned to be pivotally attached thereto a base 100 via a pivot pin 70 inserted therethrough a bore or other pivotal means and movably secured thereto the central member 57 of the respective scissor lift assembly 50. The cylinder portion 45 of each hydraulic actuator 40 extends through the slot 80 thereof upon activation therefrom the hydraulic pump 46 and stepping pedals 90. Thus, whenever the hydraulic cylinder 45 is extended, upon receipt of the action exerted thereupon the foot pedal 90, said hydraulic cylinder 45 travels upwardly therein the slot 80 in the first central member 57 and thus rotates upwardly in accordance with the pivot point 70 of said hydraulic actuator 40. Thus, when the hydraulic cylinder 45 retracts inwardly therein the hydraulic actuator 40, the upper end of the hydraulic cylinder 45 travels downwardly therein the slot 80 and thus the hydraulic actuator 40 rotates downwardly in accordance with the pivot point 70 of said hydraulic actuator 40. The hydraulic actuators 40 are envisioned to be pressurized via the hydraulic pump 46 in conjunction therewith a manual pressing of the stepping pedal 90 thereby actuating a pair of hydraulic cylinders 45. Thus, the hydraulic actuators 40 are used to raise or lower the scissor lift assemblies 50 and, consequently, the tray 20 attached thereto said scissor lift assemblies 50. Although it has been described as a pair of hydraulic actuators 40, let it be known that it may be pneumatic, electrically powered, or other means to provide the force needed to raise the tray 20.

Each scissor lift assembly 50 may comprise any configuration of support members 51, 52, 53, 54 and/or central members 57, 58 so long as said members 51, 52, 53, 54, 57, 58 are pivotally attached to each other so as to fold and unfold, as controlled via the respective hydraulic actuator 40, to lower and raise the tray 20. The illustrated scissor lift assembly 50 comprises first 51 and second 52 sets of members pivotally attached thereto the first central member 57 and third 53 and fourth 54 sets of members pivotally attached thereto the second central member 58 thereby illustrating two (2) stage lifting. The central member 57 is envisioned to be pivotally connected thereto the base 100 so that it is fixed longitudinally, but may rotate upon receipt of motion given by the hydraulic actuator 40. The support members 51, 52 are envisioned to be slidably connected thereto the base 100 via a set of rollers 63 that motion across a set of lower tracks 62 that is integrally built therein the longitudinal sides of the base 100 and the underside surface of the tray 20. It is envisioned that there is a set of lower tracks 62, laterally opposed and longitudinally extending thereon an upper surface of the base 100 and an upper set of tracks 60, laterally opposed and longitudinally extending thereon an underside surface of the tray 20 for cooperation with the second central member 58. Each set of tracks 60, 62 comprises a "U"-shaped cross section to removably receive rollers, wheels, bearings, or the like integral to the support members 51, 52 and second central member 58 to motion therealong.

The extent of the vertical displacement of the scissor lift assemblies 50, and consequently the tray 20, is controlled to some extent by the structural configuration of the set of tracks 60, 62 as well as the placement of the secured pivotal connections 70 of the central members 57 thereto the base 100. Upon receipt of the hydraulic actuators 40, firstly, the central members 57 pivotally rotate about the pivot points 70 on the base 100. The pivotal motion of the central members 57 results in the rotational pivot motion of the support members 51, 52 via the pivotal connection points 70 positioned midway along the span of said support members 51, 52 and central members 57. The rotational pivot motion causes the rollers 63 positioned at the distal end of the support members 51, 52 to motion along the set of lower tracks 62, in which is integral with the base 100, towards the opposing side at which the distal end of said support members 51, 52 originates. The first 51 and second 52 support members pivotally engage a third 53 and fourth 54 support members in which are pivotally attached thereto the underside surface of the tray 20. The third 53 and fourth 54 support members are built similarly thereto the first 51 and second 52 support members. Likewise, the first central members 57 pivotally engage respective second central members 58 in which are slidably attached thereto the underside surface of the tray 20 via a set of rollers, wheels, bearings, or the like that motion across upper tracks 60 that are integrally built therein the longitudinal middle of the underside surface of the tray 20. In this arrangement, the support members 51, 52, 53, 54 and the central members 57, 58 form the scissor lift assemblies 50 which extend upon receipt of the hydraulic lift actuators 40 to raise the tray 20 and retract upon receipt of the hydraulic lift actuators 40 to lower the tray 20. Let it be known that other scissor lift assembly 50 designs may be utilized without escaping the scope of the invention.

To initiate the activation of the hydraulic actuators 40 is a hydraulic pump 46 and two (2) integral stepping pedals 90. Specifically, actuation of the stepping pedals 90 results in the extension and retraction of the hydraulic cylinders 45 in which results in the raising and lowering of the scissor lift assemblies 50, and consequently the tray 20 thereof. The stepping pedals 90 are substantially identical to each other and integrally connected to the hydraulic pump 46. One (1) stepping pedal 90 is envisioned to activate the hydraulic pump 46 and subsequently the hydraulic actuators 40 via a communication thereof a hydraulic flow therethrough the hydraulic lines 47 to lift the tray 20 and provisions resting thereupon upwardly. Activation of the opposing stepping pedal 90 would release the hydraulic pressure in a controlled fashion thereby allowing the tray 20 and any provisions resting thereupon to be lowered in a slow and controlled fashion. The stepping pedals 90 may have a controlling mechanism (not pictured) in which would control the speed at which the tray 20 is lowered and/or raised. For instance, the stepping pedal 90 may be stepped on lightly to raise or lower the tray 20 in a slow fashion and the more pressure exerted thereupon said stepping pedals 90, the faster the tray 20 would lower or rise.

The stepping pedals 90 are envisioned to comprise a rubber tread 95 integrally attached thereto for providing greater traction. Each rubber tread 95 is envisioned to be coincidental therewith a perimeter edge of said stepping pedals to operably provide traction. The rubber treads 95 are affixed thereto the top surface of each foot pedal 90 preferably, but not essentially, by adhesive, glue, or the like; however, it will be appreciated that said rubber treads 95 may be mechanically attached thereto if so desired.

Figure 7:
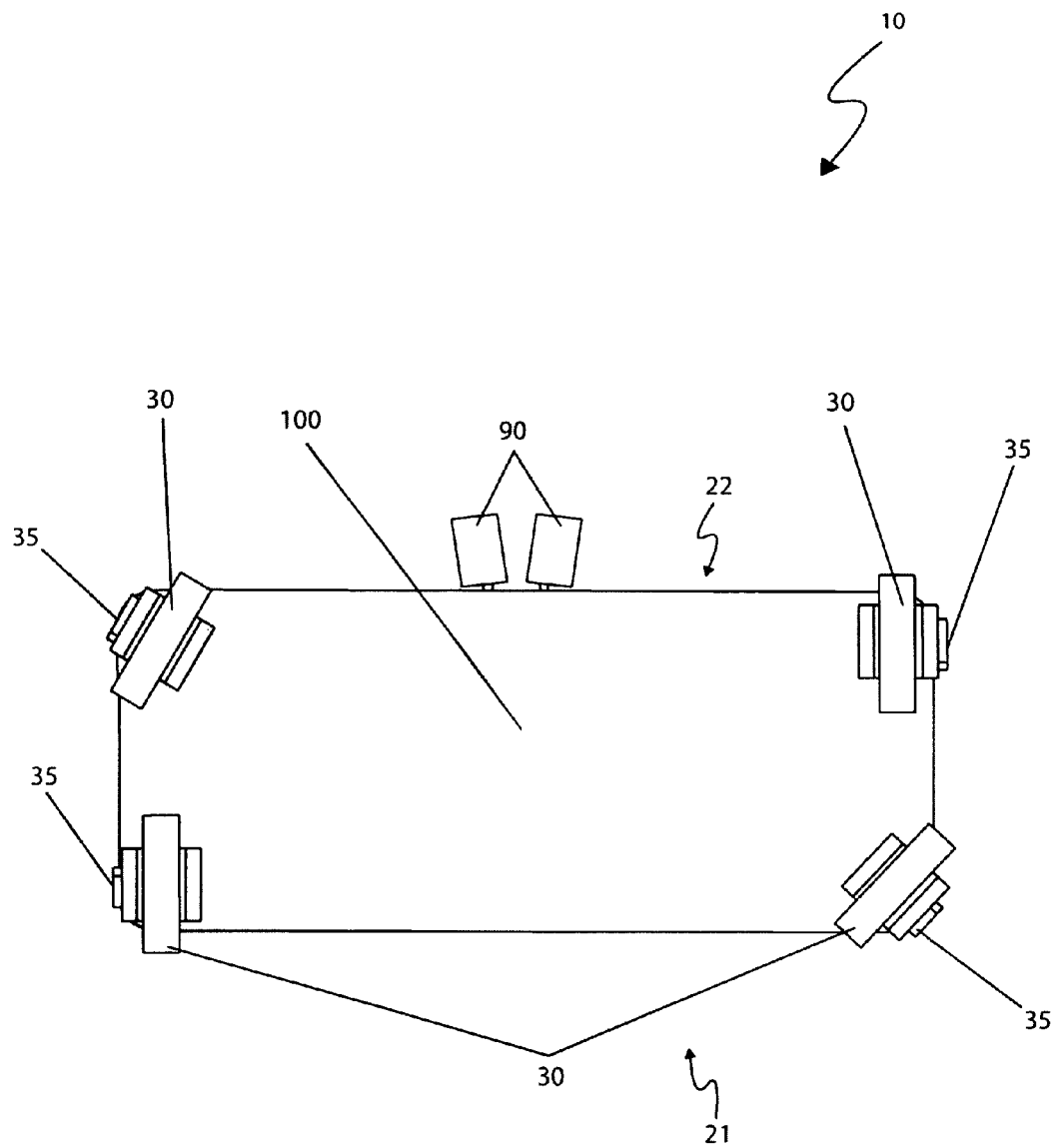

Referring now to FIG. 7, a bottom view of the apparatus 10 is disclosed according to the preferred embodiment of the present invention. The base 100 is envisioned to comprise four (4) individually attached caster wheels 30 symmetrically spaced thereto the underside of the base 100 at four (4) corners projecting downwardly outward thereby equalizing the load projected thereupon so as to make tipping less likely to occur thereby maximizing its effective stabilization even while the scissor lift assemblies 50 are in the extended orientation, as depicted in FIG. 2. This pivoting capacity of the caster wheels 30 permits easier mobility of the apparatus 10 for easier transport of the load. The radius of the wheels 30 are predetermined to have a large diameter so that there is ample space between the ground and the base 100 thereby providing motion of the apparatus 10 even over small obstructions. Each caster wheel 30 is envisioned to comprise a locking lever 35 in which would be utilized to lock the caster wheels 30, thereby preventing unwanted motion thereof.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be configured as indicated in FIGS. 1 through 7.

The method of utilizing the device may be achieved by performing the following steps: placing one (1) or more foods, for example, onto the upper surface of the tray 20 utilizing the lips 25 thereof as a barrier to refrain from spilling; unlocking the locking lever 35 on each caster wheel 30, as needed, to allow horizontal transport of the apparatus 10; motioning the apparatus 10 utilizing the four (4) individually rotatable caster wheels 30 to easily transport the apparatus 10, and consequently the food, over to the oven, for example; opening the oven door thereby exposing the entrance therein said oven; strategically placing the apparatus 10 directly in front of entrance of the oven such that the front end 21 is facing towards the entrance of the oven; motioning the apparatus 10 toward the oven such that the oven door portion is inserted therebetween the two (2) scissor lift assemblies 50; lowering the tray 20 by utilizing the foot pedal 90 in which the speed at which said tray 20 is lowered, is controlled by the amount of pressure placed onto said foot pedal 90; once the height of the tray 20 is coincidental therewith a desired oven shelf, releasing the foot pedal 90 to stop the heightening adjustment of said tray 20; moving the foods horizontally therefrom the tray 20 onto said oven shelf; and, whenever so desired to remove foods from the oven, the previously mentioned steps in the reverse order may be performed to place the food onto the countertop, table, or the like.

The apparatus 10 is intended for use in kitchens, especially when transferring food to and from ovens, stoves, and countertops. The apparatus 10 comprises foot-release pedals 90 located at the base 100 of the apparatus 10, which, when depressed, vertically adjusts a height of the tray 20 surface as desired. Thus, the user is able to equalize the height between the tray 20 and other cooking surfaces such as ovens, stoves, countertops, and serving tables. This feature allows the user to simply slide foods, items, provisions, and the like on and off of the front end portion 21 of the tray 20 without having to pick it up or carry it.

The apparatus 10 is of a design for optimum stability and strength having a tray 20 with overall dimensions sizable to accommodate a plurality of foods, provisions, items, or the like of a plurality of size and weight. Spanning along a rear end 22 and side edges of the tray 20 is a lip 25 that extends upwardly a distance so as to serve as a barrier, leaving one (1) longitudinal front end 21 open for slidably receiving and dispatching food, items, provisions, or the like.

The two (2) scissor lift assemblies 50 each comprise two (2) stages of support members 51, 52, 53, 54 and central members 57, 58 that crisscross each other being medially connected thereto each other via pivotal means 70. The first stage of each scissor lift assembly 50 pivotally connects thereto the second stage of the scissor lift assembly 50. The support members 51, 52 of the first stage are envisioned to be slidably connected thereto the base 100 via wheels, rollers, bearings, or the like that motions therealong a set of lower tracks 62 formed along the longitudinal sides of the base 100. The central member 57 of the first stage is envisioned to be pivotally connected at a fixed point on the base member 100. The support members 53, 54 of the second stage are envisioned to be pivotally connected at fixed points 70 on the underside surface of the tray 20. The central member 58 of the second stage are envisioned to be slidably connected thereto the underside of the tray 20 via wheels, rollers, bearings, or the like that motions therealong a set of upper tracks 60 formed on the underside of the tray 20. An attached upper end of the hydraulic cylinder 45 thereto the central member 57 creates originates the motion of the scissor lift assembly 50.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:
1. A height-adjustable cart apparatus comprising:
a base comprising at least a plurality of wheel assemblies rotatably attached to an underside surface;
a tray comprising an upper surface movably attached to a topside surface of said base;

a pair of scissor lift assemblies connected between outside edge regions of opposing sides of said base and said tray for vertically moving said tray relative to said base, each further comprising:
- an upper support member having rollers rotatably attached to an upper end and slidably coupled within an upper track disposed on an underside surface of said tray and a lower end;
- a lower support member having an upper end pivotably fastened to said upper support member lower end and rollers rotatably attached to a lower end and slidably coupled within a lower track disposed on said base topside surface;
- an upper central member having an upper end pivotably attached to said tray underside surface and a lower end; and,
- a lower central member having an upper end pivotably fastened to said upper central member lower end and a lower end pivotably attached to said base topside surface;

a pair of hydraulic actuators each having an end affixed to said base topside surface and an opposing end pivotably attached to one of said pair of scissor lift assemblies;

a hydraulic pump for producing hydraulic pressure comprising a vent cap located along an upper surface for allowing a user to fill said hydraulic pump with hydraulic fluid and to vent said hydraulic pump;

a pair of hydraulic lines connected between and in fluid communication with said hydraulic pump and each of said pair of hydraulic actuators; and, a pair of foot pedals affixed to said base topside surface and in fluid communication between said hydraulic pump and said pair of hydraulic actuators such that said hydraulic actuators extend and retract in response to actuation of said foot pedals;

wherein said upper support member and said upper central member are pivotably fastened at a longitudinally intermediate location and said lower support member and said lower central member are pivotably fastened at a longitudinally intermediate location; and, wherein said hydraulic actuator opposing end is pivotably attached to said lower central member, such that extension of said hydraulic actuator rotates said lower central member outwardly thus raising said tray relative to said base and retraction of said hydraulic actuator rotates said lower central member inwardly thus lowering said tray relative to said base.

2. The apparatus of claim 1, wherein said tray further comprises a lip along three perimeter sides of said tray, thereby leaving a front end exposed; said lip prevents items from falling off an upper surface of said tray.

3. The apparatus of claim 2, wherein said pair of foot pedals each further comprises a rubber tread attached thereto to provide greater traction.

4. The apparatus of claim 3, wherein at least one wheel assembly further comprises a locking lever, thereby preventing unwanted movement of said apparatus.

5. The apparatus of claim 1, wherein said pair of foot pedals each further comprises a rubber tread attached thereto to provide greater traction.

6. The apparatus of claim 1, wherein said apparatus further comprises four wheel assemblies symmetrically spaced at corner regions of said underside surface of said base.

7. The apparatus of claim 6, wherein at least one wheel assembly further comprises a locking lever, thereby preventing unwanted movement of said apparatus.

* * * * *